US006404073B1

(12) United States Patent
Chiang

(10) Patent No.: US 6,404,073 B1
(45) Date of Patent: Jun. 11, 2002

(54) DEVICE FOR PREVENTING THEFT OF MOTOR VEHICLE BY JACKING UP MOTOR VEHICLE AT THE TIME OF THEFT UNDER WAY

(76) Inventor: Shih-Chung Chiang, 11F, No. 319, Shu Hsiao Rd., Tai Ping City, Taichung Hsian (TW)

( * ) Notice: Subject to any disclaimer, the term of this patent is extended or adjusted under 35 U.S.C. 154(b) by 0 days.

(21) Appl. No.: 09/527,290

(22) Filed: Mar. 17, 2000

(51) Int. Cl.[7] .................................................. B60L 1/00
(52) U.S. Cl. .................... 307/10.1; 307/10.05; 254/423
(58) Field of Search .............................. 307/10.1, 10.2, 307/10.05; 254/418, 423, 419, 420

(56) References Cited

U.S. PATENT DOCUMENTS 5,224,688 A * 7/1993 Torres et al. ............... 254/423
5,969,433 A * 10/1999 Maggiora et al. .......... 307/10.5
6,237,953 B1 * 5/2001 Farmer .................... 280/763.1

* cited by examiner

*Primary Examiner*—Rajnikant B. Patel
(74) *Attorney, Agent, or Firm*—Browdy & Neimark, P.L.L.C.

(57) ABSTRACT

A device is designed to prevent a car theft and is provided with a remote controller for activating or deactivating the device. The device comprises a control unit, one or more oil pressure jacks, one or more oil pressure driving apparatus, and a plurality of sensors capable of transmitting a triggering signal to the control unit at such time when the car body is exerted on by external forces. As the control unit is triggered, the oil pressure driving apparatus are actuated to drive the oil pressure jacks to hoist the car body, thereby preventing the car from being driven away by an unauthorized person.

9 Claims, 6 Drawing Sheets

REMOTE CONTROLLER
31
JACKS
11
13
21
OIL PRESSURE DRIVING APPARATUS
RELAYS
47
53
45
41
CONTROL UNIT
BATTERY
51
61 CHIP LOCKING SET
63
65
SENSORS
55
HEIGHT SENSORS
56
CAR ROOF SENSOR
57
LEVEL SENSORS
59
SIGNAL RECEIVER
43
10

DEVICE FOR PREVENTING THEFT OF MOTOR VEHICLE BY JACKING UP MOTOR VEHICLE AT THE TIME OF THEFT UNDER WAY

FIELD OF THE INVENTION

The present invention relates generally to a device for preventing a car from being stolen, and more particularly to a device for preventing the theft of a car by jacking up the car at the time when the theft is under way.

BACKGROUND OF THE INVENTION

The conventional car burglary preventing device comprises a control unit, a loud speaker, a plurality of sensors, and a remote controller. The control unit and the loud speaker are installed in the inside of the car. The user of the device uses the remote controller to transmit a control signal to turn on or off the control unit. As the control unit is turned on, it is capable of triggering the loud speaker to give off the alarm to frighten the burglar.

Such a conventional device as described above is in fact ineffective in preventing the theft of the car. A remedial measure is added such that the power source of the starter is simultaneously shut off at the time when the alarm is given off. However, the remedial measure often fails to prevent the car from being stolen by a skillful thief who is capable of reconnecting the power source.

Nowadays the car thieves are so arrogantly aggressive that they just simply tow away a car which they intend to steal. Under such a circumstance, all conventional devices in existence have become obsolete.

SUMMARY OF THE INVENTION

It is therefore the primary objective of the present invention to provide a device which is more effective than the conventional devices in preventing the car burglary.

It is another objective of the present invention to provide an effective device to prevent the car theft.

It is still another objective of the present invention to provide a device capable of jacking up a car at the time when the car is being tampered with by an unauthorized person.

In keeping with the principle of the present invention, the foregoing objectives of the present invention are attained by a device comprising at least one oil pressure jack, at least one oil pressure driving device, a remote controller, a receiver, a control unit, and a plurality of sensors. The oil pressure jack is mounted in the bottom of a car frame and is driven by the oil pressure driving device to extract or retract. The remote controller is used by its user to transmit two different kinds of signals to activate or deactivate the car theft preventing device of the present invention. The signals transmitted by the remote controller are received by the receiver which is disposed in a predetermined position of the car body. The control unit is disposed in a predetermined position of the car body and is provided with an output end which is connected with the oil pressure driving device. The control unit is also connected with the receiver via which the control unit receives the signal transmitted by the remote controller so as to control the action of the oil pressure driving device. The sensors are disposed in the predetermined positions of the car body and are connected with the control unit. As any one of the sensors detects any vibration of the car body, the sensors transmit an electronic signal to the control unit which in turn activates the oil pressure driving device to drive the oil pressure jack to hoist the car body.

The foregoing objectives, features and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
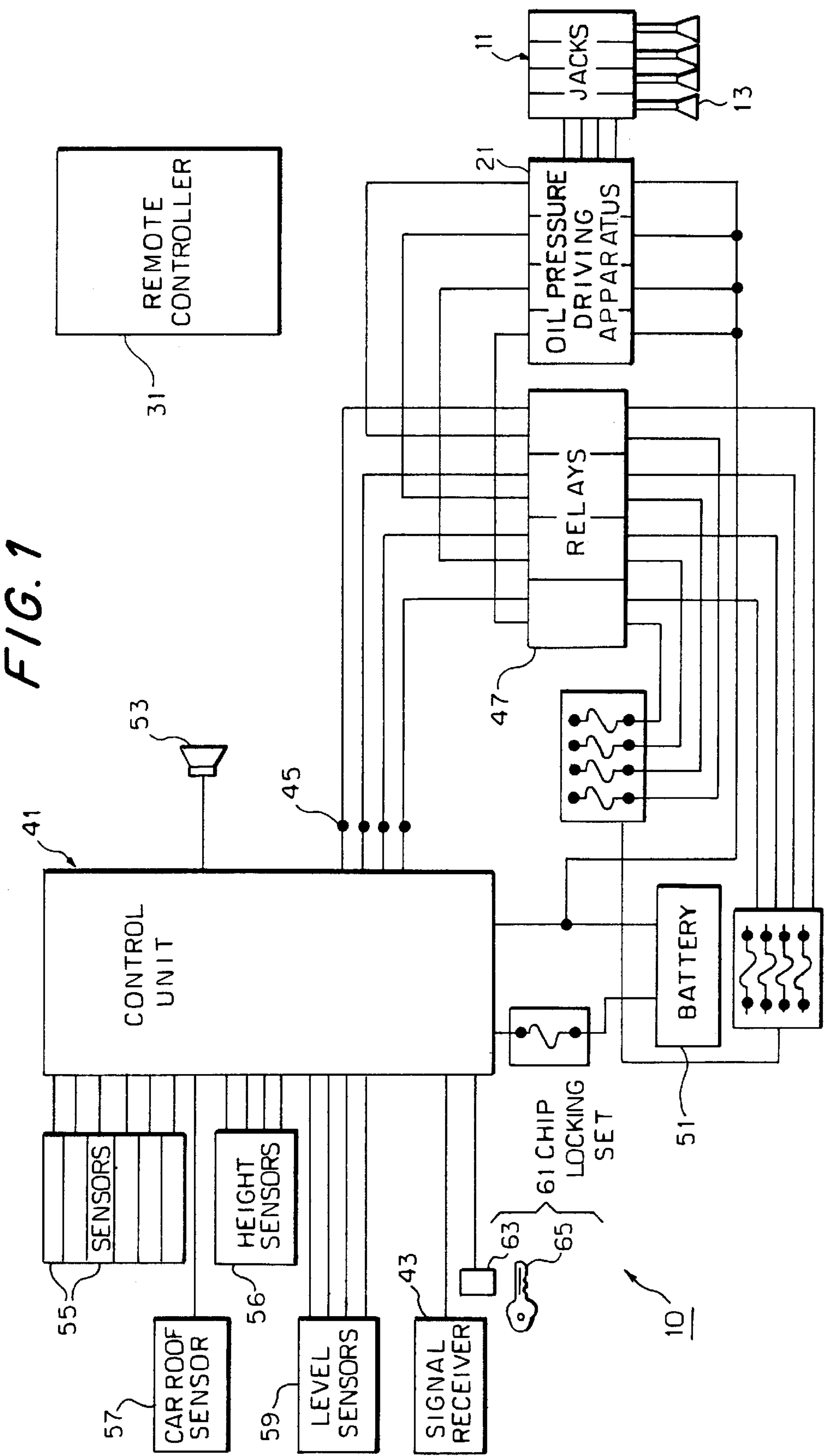
FIG. 1 shows a schematic view of the layout of the preferred embodiment of the present invention.
Figure 2:
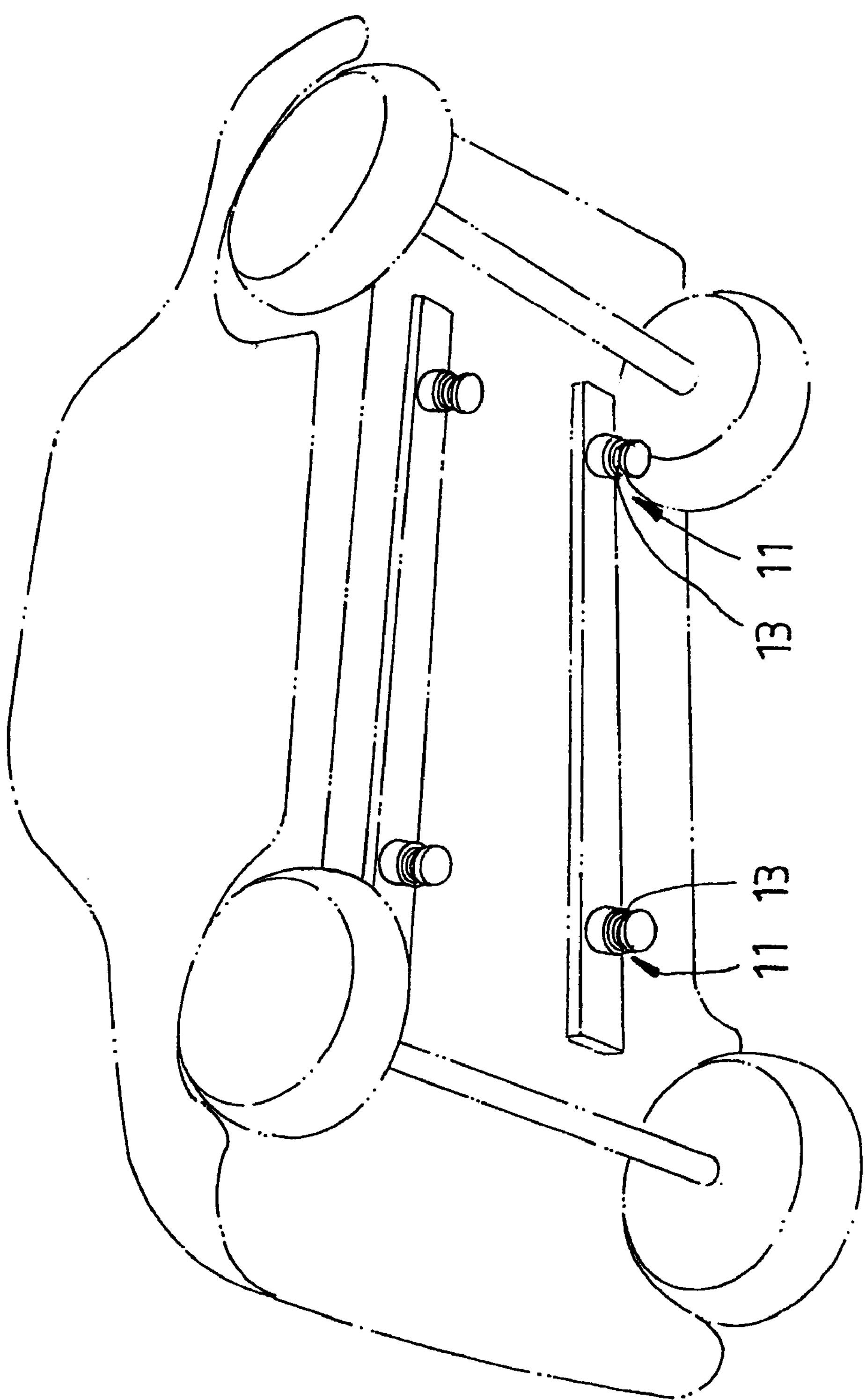
FIG. 2 is a schematic view showing that the oil pressure jack of the present invention is mounted in the underside of a car body frame.

As shown in FIGS. 1 and 2, a car theft preventing device 10 embodied in the present invention comprises four oil pressure jacks 11, four oil pressure driving apparatus 21, one remote controller 31, one signal receiver 43, and one control unit 41.

The four oil pressure jacks 11 are mounted in the front and the rear sections of the.,underside of a car body frame and are provided with an extractable and retractable support rod 13.

The four oil pressure driving apparatus 21 are respectively, connected with the four oil pressure jacks 11 for driving the support rod 13 of each jack 11 to extract or retract.

The remote controller 31 is used to transmit an operation signal.

The control unit 41 of the preferred embodiment of the present invention is a single chip controller in which a predetermined control program is recorded for specifying the operations to be performed. The control unit 41 is connected with the signal receiver 43 and provided with four output ends 45, with each being connected with one oil pressure driving apparatus 21 via a relay 47. The remote controller 31 emits an operation signal, which is then transmitted to the control unit 41 via the signal receiver 43 such that the control unit 41 gives off a control signal on the basis of the operation signal. The control signal serves to control via the output end 45 the operation of the oil pressure driving apparatus 21 which in turn controls the operation of the oil pressure jack 11.

The preferred embodiment of the present invention further comprises an independent storage battery 51, a loudspeaker 53, a plurality of sensors 55, a plurality of height sensors 56, a car roof sensor 57, four level sensors 59, and a chip locking set 61.

The storage battery 51 is disposed in a predetermined position of a motor vehicle and is connected with the oil pressure driving apparatus 21. The storage battery 51 is in a parallel connection with the alternator of the motor vehicle and is capable of providing independently the oil pressure driving apparatus 21 with the power. In the meantime, the storage battery 51 is capable of storing an electrical charge generated by the alternator. The storage battery 51 is thus independent of the electrical system of the motor vehicle.

The loudspeaker 53 is connected with and controlled by the control unit 41.

The sensors 55 are mounted respectively on various parts of the body of the motor vehicle, such as doors, hood, trunk lid, etc. The sensors 55 are connected with the control unit 41 and are intended to detect the opening of the doors, hood, trunk lid of the motor vehicle by the unauthorized person.

The height sensors 56 are mounted respectively on the shock absorbers of the motor vehicle such that the height sensors 56 are connected with the control unit 41. The height sensors 56 are intended to detect any change in height of the motor vehicle.

The roof sensor 57 is mounted in the roof of the motor vehicle and is connected with the control unit 41. The roof sensor 57 is intended to detect an obstacle over top of the roof or the distance between the roof of the motor vehicle and the roof of a garage.

The level sensors 59 are fastened with the body of the motor vehicle and are connected with the control unit 41. The level sensors 59 are used to detect a change in the longitudinal or horizontal level of the body of the motor vehicle.

The chip locking set 61 has a chip lock 63 and a chip key 65. The chip locking set 61 is connected with the control unit 41. The chip lock 63 is capable of transmitting an "OFF" signal to the control unit 41 only after the chip key 65 is properly inserted into the chip lock 63.

Figure 3:
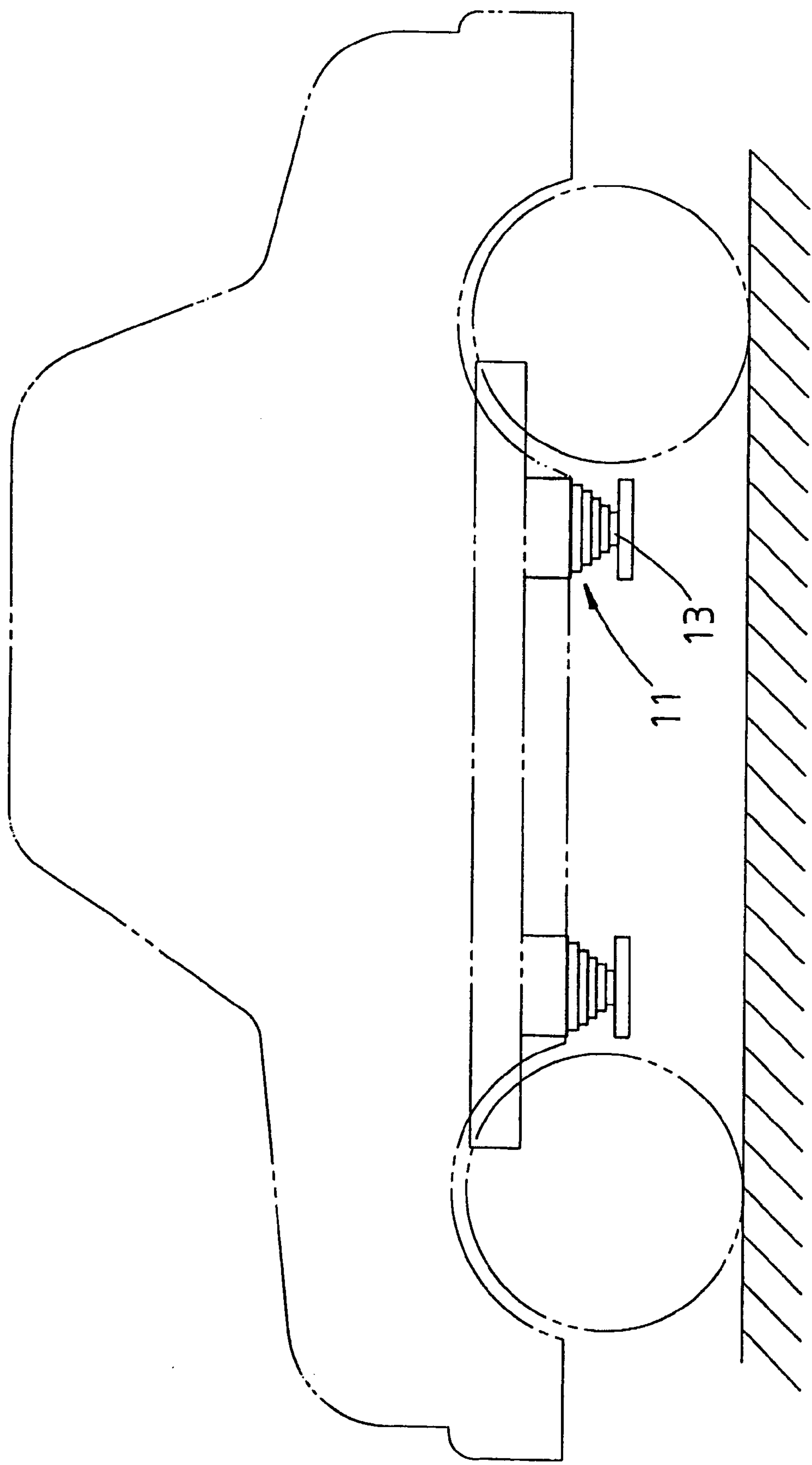
FIG. 3 is a schematic view of the oil pressure jacks of the present invention in the standby state.
Figure 4:
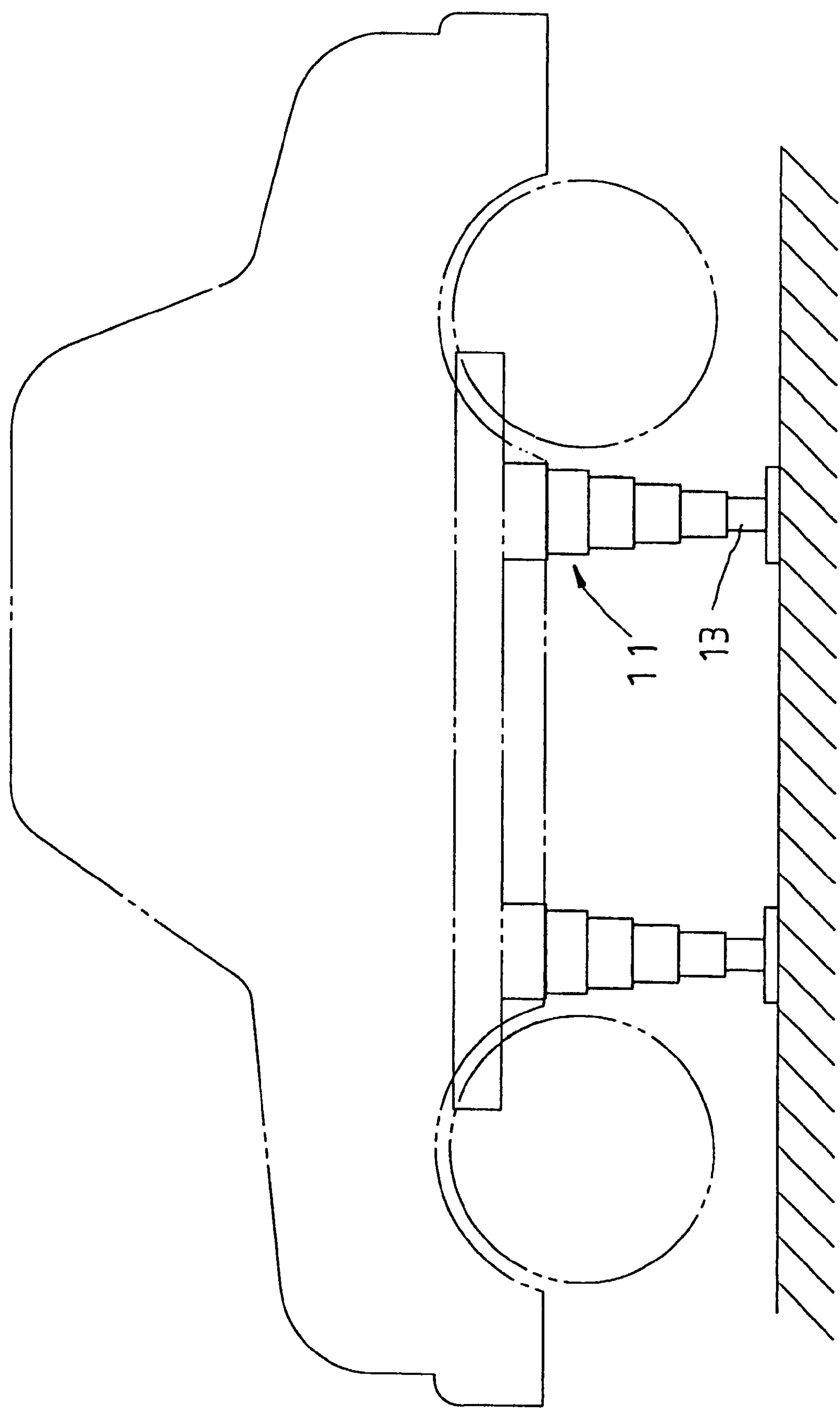
FIG. 4 shows a schematic view of the oil pressure jacks of the present invention at work.

As illustrated in FIG. 3, the device 10 of the present invention is activated as soon as the "ON" key of the remote controller 31 is pressed. The control unit 41 receives the activation signal via the signal receiver 43. As a result, The device is ready to operate. When the motor vehicle is tampered with such that the door, the hood, or the trunk lid is opened or damaged, and that the height of the body of the motor vehicle is changed up to 3 centimeters, and further that the height sensors 56 have been triggered up to 3 seconds, as shown in FIG. 4, the control signals are transmitted via the four output ends 45 of the control unit 41 to activate the oil pressure driving apparatus 21, thereby resulting in the extraction of the support rod 13 of each jack 11. The motor vehicle is thus raised. In the meantime, The alarm is sounded by the loudspeaker 53 to frighten the thief. The power that is used to operate the oil pressure driving apparatus 21 is furnished by the storage battery 51, without making use of the power of the storage battery of the motor vehicle. As the body of the motor vehicle is hoisted by the support rods 13 of the jacks 11, the level state of the body of the motor vehicle is detected by the level sensors 59 so as to enable the control unit 41 to control the adjustment of the support rods 13 to keep the body of the motor vehicle in the well-balanced state even on the slope on which the motor vehicle is parked. The hoisting of the motor vehicle by the jacks 11 is coordinated with the roof sensor 57 so as to avert the damage of the roof of the motor vehicle by the obstacle located over the roof the of motor vehicle.

The activated device 10 of the present invention is deactivated by pressing the "OFF" key of the remote controller 31. In the event that the operation of the device 10 is in progress, the device 10 can be deactivated by pressing the "OFF" key of the remote controller 31. Upon having received the instruction, the control unit 41 stops the buzzing of the loudspeaker 53. In the meantime, the user of the device 10 inserts the chip key 65 into the chip lock 63. As a result, the oil pressure driving apparatus 21 are controlled by the control unit 41 to retract the jacks 11, so as to lower the body of the motor vehicle to its original position, as shown in FIG. 3.

Figure 5:
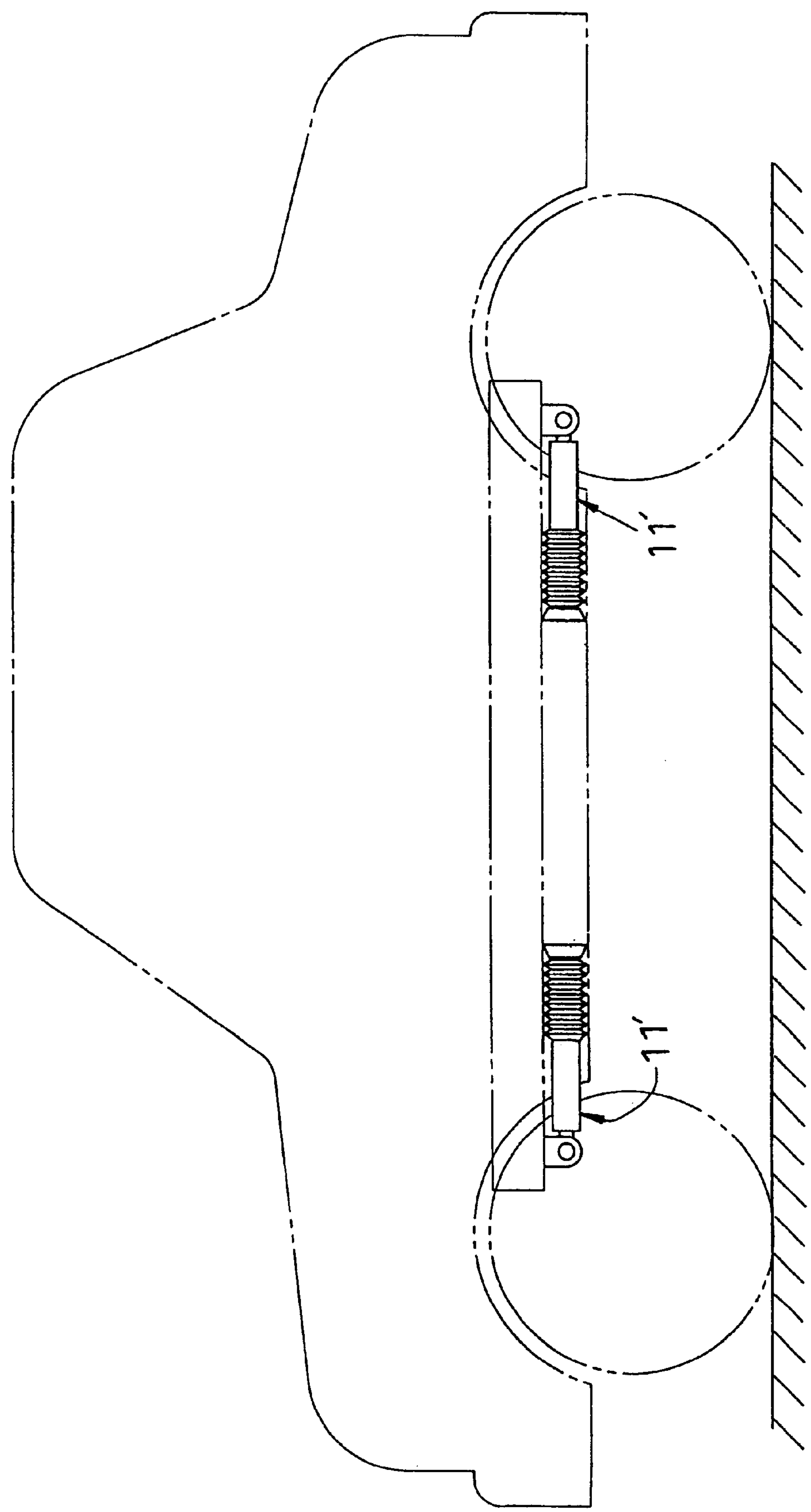
FIG. 5 shows a schematic view of another oil pressure jacks of the present invention in the standby state.
Figure 6:
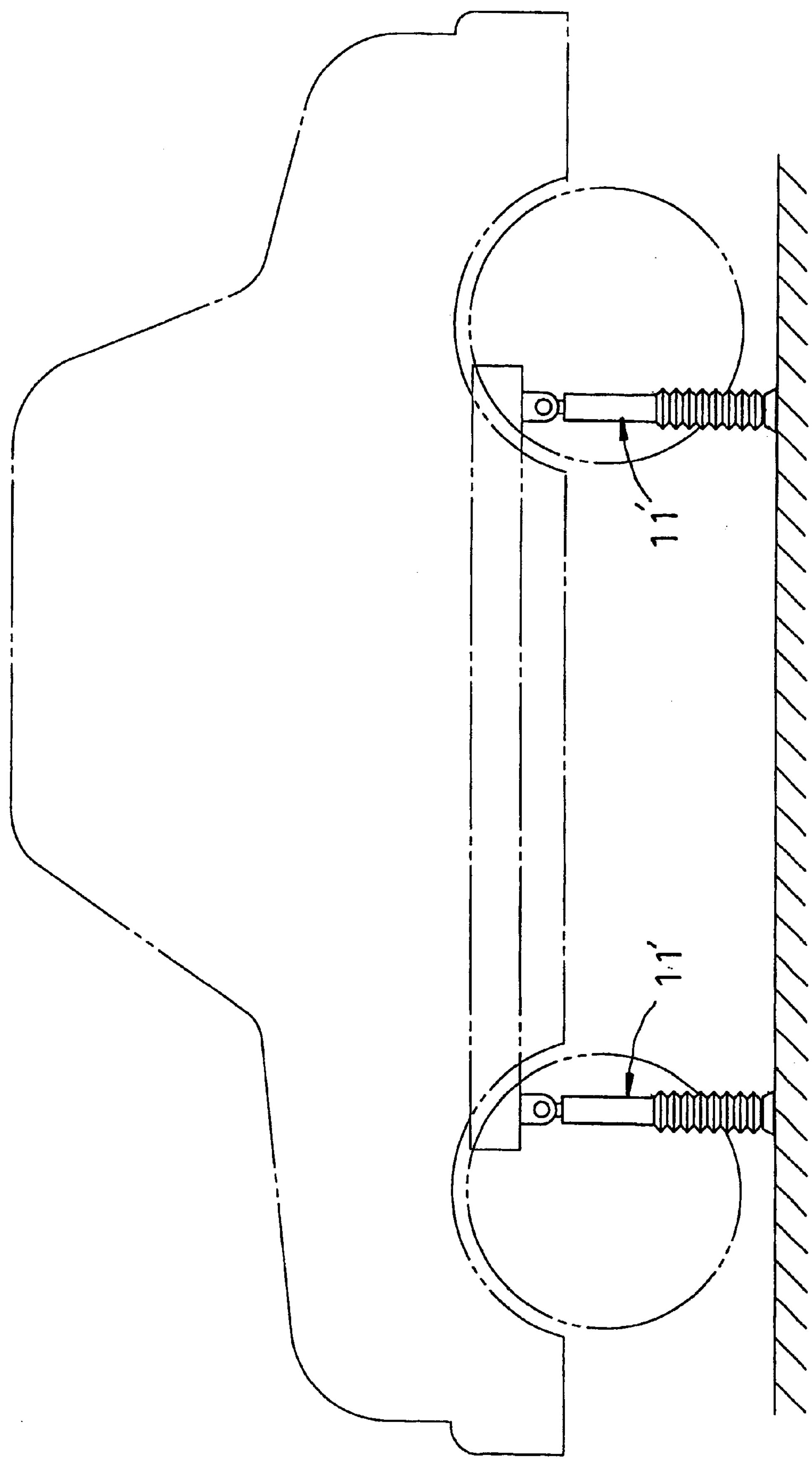
FIG. 6 shows a schematic view of the action of the oil pressure jacks as shown in FIG. 5.

As shown in FIGS. 5 and 6, the device of the present invention may comprise a plurality of oil pressure jacks 11', with each having a support rod and a swiveling apparatus (not shown in the drawings) to enable the body frame of the motor vehicle to swivel horizontally or vertically.

It is therefore readily apparent that the device 10 of the present invention overcomes the deficiencies of the conventional devices for preventing car burglary or theft. The remote controller 31 of the present invention may be optionally provided with keys, such as "up" key, "STOP" key, "DOWN" key, etc. for the control of the elevation of the oil pressure jacks by the control unit, so as to facilitate the replacing of a flat tire or the changing of the engine oil of the motor vehicle. The loudspeaker 53 is an optional equipment.

What is claimed is:

1. A device for preventing the burglary or theft of a motor vehicle, said device comprising:

at least one oil pressure jack mounted in the underside of a body frame of the motor vehicle;

at least one oil pressure driving apparatus mounted in a predetermined position of the body frame of the motor vehicle for driving said oil pressure jack;

a remote controller for activating and deactivating said device;

a receiver disposed in a predetermined position of the motor vehicle for receiving a signal transmitted by said remote controller;

a control unit disposed in a predetermined position of the motor vehicle and provided with at least one output end which is connected with said oil pressure driving apparatus, said control unit being connected with said receiver via which said control unit receives the signal transmitted by said remote controller; and a plurality of sensors disposed in a plurality of positions of the motor vehicle for detecting external forces exerting on the body frame of the motor vehicle whereby said sensors transmit signals to said control unit at such time when said sensors have detected that the body frame of the motor vehicle is being exerted on by the external forces, thereby causing said control unit to transmit a control signal to actuate said oil pressure driving apparatus so as to drive said oil pressure jack to hoist the body frame of the motor vehicle.

2. The device as defined in claim 1, wherein said control unit is provided with at least one relay whereby said relay is connected with said output end of said control unit; and wherein said control unit actuates said oil pressure driving apparatus via said relay.

3. The device as defined in claim 1, wherein said control unit is provide with four output ends, with each being connected with one oil pressure driving apparatus whereby said one oil pressure driving apparatus is connected with one oil pressure jack.

4. The device as defined in claim 1 further comprising a storage battery independent of a storage battery of the motor vehicle and being connected with said oil pressure driving apparatus and an alternator of the motor vehicle.

5. The device as defined in claim 1 further comprising a loudspeaker whereby said loudspeaker is disposed in a predetermined position of the motor vehicle and is connected with said control unit.

6. The device as defined in claim 1 further comprising a plurality of height sensors whereby said height sensors are fastened with the shock absorbers of the motor vehicle and are connected with said control unit for detecting a change in height of the motor vehicle.

7. The device as defined in claim 1 further comprising a roof detector whereby said roof detector is connected with said control unit and is mounted on the roof of the motor vehicle for monitoring the position of the roof of the motor vehicle at such time when said oil pressure jack is in operation to raise the body frame of the motor vehicle.

8. The device as defined in claim 1 further comprising at least two level sensors whereby said level sensors are disposed in the body frame of the motor vehicle and are connected with said control unit for monitoring the horizontal position of the body frame of the motor vehicle at such time when said oil pressure jack is in action to lift the body frame of the motor vehicle.

9. The device as defined in claim 1 further comprising a chip lock set having a chip lock and a chip key whereby said chip lock is disposed in the motor vehicle and is connected with said control unit such that said chip lock transmits a signal to deactivate said control unit at the time when said chip key is inserted into said chip lock.

* * * * *